(12) United States Patent
Raghavan

(10) Patent No.: US 7,699,745 B2
(45) Date of Patent: Apr. 20, 2010

(54) MULTI-SPEED TRANSMISSIONS WITH A LONG PINION AND ONE FIXED INTERCONNECTION

(75) Inventor: Madhusudan Raghavan, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 173 days.

(21) Appl. No.: 11/440,513

(22) Filed: May 25, 2006

(65) Prior Publication Data

US 2007/0275815 A1    Nov. 29, 2007

(51) Int. Cl.
    *F16H 3/44* (2006.01)
(52) U.S. Cl. ..................................... 475/284
(58) Field of Classification Search .......... 475/275–291
    See application file for complete search history.

(56) References Cited

U.S. PATENT DOCUMENTS

| | | | | |
|---|---|---|---|---|
| 3,853,023 A * | 12/1974 | Mori et al. | ................ | 475/281 |
| 4,070,927 A | 1/1978 | Polak | ................ | 475/286 |
| 4,709,594 A | 12/1987 | Maeda | ................ | 475/280 |
| 5,106,352 A | 4/1992 | Lepelletier | ................ | 475/280 |
| 5,133,697 A * | 7/1992 | Hattori | ................ | 475/276 |
| 5,226,862 A * | 7/1993 | Hattori | ................ | 475/286 |
| 5,385,064 A | 1/1995 | Reece | ................ | 74/331 |
| 5,497,867 A | 3/1996 | Hirsch et al. | ................ | 192/48.91 |
| 5,560,461 A | 10/1996 | Loeffler | ................ | 192/53.32 |
| 5,599,251 A | 2/1997 | Beim et al. | ................ | 475/275 |
| 5,641,045 A | 6/1997 | Ogawa et al. | ................ | 192/53.341 |
| 6,361,468 B1 * | 3/2002 | Kato et al. | ................ | 475/344 |
| 6,558,287 B2 * | 5/2003 | Hayabuchi et al. | ................ | 475/271 |
| 6,849,022 B2 * | 2/2005 | Miyazaki et al. | ................ | 475/275 |
| 6,997,843 B2 * | 2/2006 | Saitou | ................ | 475/269 |
| 7,169,075 B2 * | 1/2007 | Seo et al. | ................ | 475/278 |
| 7,354,376 B2 * | 4/2008 | Rihn et al. | ................ | 475/284 |

FOREIGN PATENT DOCUMENTS

JP         09-126283        5/1997

* cited by examiner

*Primary Examiner*—Roger Pang
(74) *Attorney, Agent, or Firm*—Quinn Law Group, PLLC

(57) ABSTRACT

The family of transmissions has a plurality of members that can be utilized in powertrains to provide at least five forward speed ratios and one reverse speed ratio. The transmission family members include three planetary gear sets having up to seven torque-transmitting mechanisms and three interconnecting members. The powertrain includes an engine that is selectively or continuously connectable to at least one of the planetary gear members and an output shaft that is continuously connected with another one of the planetary gear members. The torque-transmitting mechanisms provide interconnections between various gear members, the input shaft and the transmission housing, and are operated in combinations of two to establish at least five forward speed ratios and at least one reverse speed ratio.

15 Claims, 11 Drawing Sheets

| | RATIOS | 54 | 55 | 56 | 50 | 52 |
|---|---|---|---|---|---|---|
| Reverse | -4.19 | X | | X | | |
| Neutral | 0.00 | | | X | | |
| 1 | 3.56 | | | X | | X |
| 2 | 1.92 | | X | | | X |
| 3 | 1.38 | X | | | | X |
| 4 | 1.00 | | | | X | X |
| 5 | 0.75 | X | | | X | |
| 6 | 0.64 | | X | | X | |

(X = ENGAGED CLUTCH)

| RATIO SPREAD | 5.56 |
|---|---|
| RATIO STEPS | |
| REV/1 | -1.18 |
| 1/2 | 1.85 |
| 2/3 | 1.39 |
| 3/4 | 1.38 |
| 4/5 | 1.33 |
| 5/6 | 1.17 |

SAMPLE DESIGN:

$\frac{\text{RING GEAR}}{\text{SUN GEAR}}$ TOOTH RATIO: $\frac{N_{R1}}{N_{S1}} = 3.2$  $\frac{N_{R2}}{N_{S2}} = 2.0$  $\frac{N_{R3}}{N_{S3}} = 1.78$

| | RATIOS | 154 | 155 | 156 | 150 | 152 |
|---|---|---|---|---|---|---|
| Reverse | -3.9 | X | | X | | |
| Neutral | 0 | X | | | | |
| 1 | 4.54 | X | | | | X |
| 2 | 2.42 | | | X | | X |
| 3 | 1.56 | | | X | X | |
| 4 | 1 | | | | X | X |
| 5 | 0.71 | | | X | X | |
| 6 | 0.6 | | X | | X | |

(X = ENGAGED CLUTCH)

| RATIO SPREAD | 7.57 |
|---|---|
| RATIO STEPS | |
| REV/1 | -0.86 |
| 1/2 | 1.88 |
| 2/3 | 1.55 |
| 3/4 | 1.56 |
| 4/5 | 1.41 |
| 5/6 | 1.18 |

SAMPLE DESIGN:

$\frac{\text{RING GEAR}}{\text{SUN GEAR}}$ TOOTH RATIO: $\frac{N_{R1}}{N_{S1}} = 1.50 \quad \frac{N_{R2}}{N_{S2}} = 2.76 \quad \frac{N_{R3}}{N_{S3}} = 1.60$

| | RATIOS | 250 | 252 | 254 | 255 | 256 |
|---|---|---|---|---|---|---|
| Reverse | -1.44 | | | | X | X |
| Neutral | 0 | | | | | |
| 1 | 2.7 | X | | X | | |
| 2 | 1.45 | X | | | X | |
| 3 | 1 | | X | | X | |
| 4 | 0.71 | X | X | | | |
| 5 | 0.59 | | X | | | X |
| 6 | 0.47 | X | | | | X |

(X = ENGAGED CLUTCH)

| RATIO SPREAD | 5.77 |
|---|---|
| RATIO STEPS | |
| REV/1 | -0.53 |
| 1/2 | 1.87 |
| 2/3 | 1.45 |
| 3/4 | 1.41 |
| 4/5 | 1.2 |
| 5/6 | 1.26 |

SAMPLE DESIGN:

$\frac{\text{RING GEAR}}{\text{SUN GEAR}}$ TOOTH RATIO: $\frac{N_{R1}}{N_{S1}} = 1.53 \quad \frac{N_{R2}}{N_{S2}} = 1.93 \quad \frac{N_{R3}}{N_{S3}} = 2.43$

| | RATIOS | 454 | 455 | 456 | 457 | 450 | 452 |
|---|---|---|---|---|---|---|---|
| Reverse | -3.82 | | X | | X | | |
| Neutral | 0.00 | | | | X | | |
| 1 | 3.98 | | | | X | | X |
| 2 | 2.04 | | | X | | | X |
| 3 | 1.35 | | X | | | | X |
| 4 | 1.00 | | | | | X | X |
| 5 | 0.78 | | X | | | X | |
| 6 | 0.65 | | | X | | X | |
| 7 | 0.56 | X | | | | X | |

(X = ENGAGED CLUTCH)

| RATIO SPREAD | 7.11 |
|---|---|
| RATIO STEPS | |
| REV/1 | -0.96 |
| 1/2 | 1.95 |
| 2/3 | 1.51 |
| 3/4 | 1.35 |
| 4/5 | 1.27 |
| 5/6 | 1.21 |
| 6/7 | 1.16 |

SAMPLE DESIGN:

$\frac{\text{RING GEAR}}{\text{SUN GEAR}}$ TOOTH RATIO: $\frac{N_{R1}}{N_{S1}} = 3.34$  $\frac{N_{R2}}{N_{S2}} = 2.13$  $\frac{N_{R3}}{N_{S3}} = 1.87$

| | RATIOS | 550 | 552 | 554 | 555 | 556 | 557 |
|---|---|---|---|---|---|---|---|
| Reverse | -3 | | | X | | X | |
| Neutral | 0 | | | | | X | |
| 1 | 5.1 | | | | X | X | |
| 2 | 2.86 | | X | | | X | |
| 3 | 2.01 | | X | | X | | |
| 4 | 1.46 | | X | | | | X |
| 5 | 1 | X | X | | | | |
| 6 | 0.75 | X | | | | | X |
| 7 | 0.65 | X | | | X | | |

| RATIO SPREAD | 7.8 |
|---|---|
| RATIO STEPS | |
| REV/1 | -0.59 |
| 1/2 | 1.79 |
| 2/3 | 1.42 |
| 3/4 | 1.38 |
| 4/5 | 1.46 |
| 5/6 | 1.33 |
| 6/7 | 1.15 |

(X = ENGAGED CLUTCH)

SAMPLE DESIGN:

$\frac{\text{RING GEAR}}{\text{SUN GEAR}}$ TOOTH RATIO: $\frac{N_{R1}}{N_{S1}} = 1.86$ $\frac{N_{R2}}{N_{S2}} = 3.05$ $\frac{N_{R3}}{N_{S3}} = 1.70$

| | RATIOS | 650 | 652 | 654 | 655 | 656 | 657 |
|---|---|---|---|---|---|---|---|
| Reverse | -0.34 | | X | X | X | | |
| Neutral | 0 | | X | X | | | |
| 1 | 3.03 | | X | X | | X | |
| 2 | 1.52 | X | | X | | X | |
| 3 | 1 | X | X | X | | | |
| 4 | 0.74 | X | | X | | | X |
| 5 | 0.65 | X | | | X | | |
| 6 | 0.59 | X | | | | X | X |
| 7 | 0.49 | X | X | | X | | |

| RATIO SPREAD | 6.17 |
|---|---|
| RATIO STEPS | |
| REV/1 | -0.11 |
| 1/2 | 1.98 |
| 2/3 | 1.52 |
| 3/4 | 1.35 |
| 4/5 | 1.14 |
| 5/6 | 1.11 |
| 6/7 | 1.19 |

(X = ENGAGED CLUTCH)

SAMPLE DESIGN:

$\frac{\text{RING GEAR}}{\text{SUN GEAR}}$ TOOTH RATIO: $\frac{N_{R1}}{N_{S1}} = 1.87$ $\frac{N_{R2}}{N_{S2}} = 2.59$ $\frac{N_{R3}}{N_{S3}} = 2.03$

| | RATIOS | 750 | 752 | 754 | 755 | 756 | 757 |
|---|---|---|---|---|---|---|---|
| Reverse | -4.53 | | X | X | | | X |
| Neutral | 0 | | X | | | | X |
| 1 | 4.54 | | X | | X | | X |
| 2 | 2.41 | | X | | X | X | |
| 3 | 1.64 | | X | X | X | | |
| 4 | 1 | X | X | | X | | |
| 5 | 0.82 | X | | | X | X | |
| 6 | 0.69 | X | | X | X | | |
| 7 | 0.6 | X | | | X | | X |

| RATIO SPREAD | 7.54 |
|---|---|
| RATIO STEPS | |
| REV/1 | -1 |
| 1/2 | 1.88 |
| 2/3 | 1.47 |
| 3/4 | 1.64 |
| 4/5 | 1.22 |
| 5/6 | 1.18 |
| 6/7 | 1.15 |

(X = ENGAGED CLUTCH)
SAMPLE DESIGN:

$\frac{\text{RING GEAR}}{\text{SUN GEAR}}$ TOOTH RATIO: $\frac{N_{R1}}{N_{S1}} = 3.01$  $\frac{N_{R2}}{N_{S2}} = 1.51$  $\frac{N_{R3}}{N_{S3}} = 2.00$

| | RATIOS | 850 | 852 | 854 | 855 | 856 | 857 | 858 |
|---|---|---|---|---|---|---|---|---|
| Reverse | -4.34 | | | | X | X | | |
| Neutral | 0.00 | | | | X | | | |
| 1 | 5.90 | | | | X | | | X |
| 2 | 4.08 | | | X | | | | X |
| 3 | 2.88 | X | | X | | | | |
| 4 | 1.73 | | | X | | | X | |
| 5 | 1.42 | | X | | | | | X |
| 6 | 1.00 | X | X | | | | | |
| 7 | 0.70 | | X | | X | | | |
| 8 | 0.60 | | X | | | | X | |

| RATIO SPREAD | 9.81 |
|---|---|
| RATIO STEPS | |
| REV/1 | -0.74 |
| 1/2 | 1.44 |
| 2/3 | 1.42 |
| 3/4 | 1.66 |
| 4/5 | 1.22 |
| 5/6 | 1.42 |
| 6/7 | 1.43 |
| 7/8 | 1.16 |

(X = ENGAGED CLUTCH)

SAMPLE DESIGN:

$\frac{\text{RING GEAR}}{\text{SUN GEAR}}$ TOOTH RATIO: $\frac{N_{R1}}{N_{S1}} = 1.51$  $\frac{N_{R2}}{N_{S2}} = 2.43$  $\frac{N_{R3}}{N_{S3}} = 1.88$

| | RATIOS | 950 | 952 | 954 | 955 | 956 | 957 | 958 |
|---|---|---|---|---|---|---|---|---|
| Reverse | -3.88 | | | X | X | | X | |
| Reverse' | -2.65 | | X | | X | | X | |
| Reverse" | -1.81 | | X | | | X | X | |
| Neutral | 0.00 | | | X | X | | | |
| 1 | 4.74 | | | X | X | | | X |
| 2 | 3.24 | | | X | | X | | X |
| 3 | 2.21 | | X | | | X | | X |
| 4 | 1.61 | X | X | | | | | X |
| 5 | 1.21 | X | X | | | X | | |
| 6 | 1.00 | X | X | | X | | | |
| 7 | 0.89 | X | | X | X | | | |
| 8 | 0.73 | X | | | | X | X | |

| RATIO SPREAD | 6.53 |
|---|---|
| RATIO STEPS | |
| REV/1 | -0.82 |
| 1/2 | 1.46 |
| 2/3 | 1.47 |
| 3/4 | 1.37 |
| 4/5 | 1.33 |
| 5/6 | 1.21 |
| 6/7 | 1.12 |
| 7/8 | 1.22 |

(X = ENGAGED CLUTCH)

SAMPLE DESIGN:

$\frac{\text{RING GEAR}}{\text{SUN GEAR}}$ TOOTH RATIO: $\frac{N_{R1}}{N_{S1}} = 3.04$ $\frac{N_{R2}}{N_{S2}} = 2.65$ $\frac{N_{R3}}{N_{S3}} = 2.15$

| | RATIOS | 1054 | 1055 | 1050 | 1052 |
|---|---|---|---|---|---|
| Reverse | -5.07 | | X | X | |
| Neutral | 0.00 | | X | | |
| 1 | 5.35 | | | X | X |
| 2 | 3.63 | X | X | | |
| 3 | 1.99 | X | | | X |
| 4 | 1.38 | X | | X | |
| 5 | 1 | | | X | X |

(X = ENGAGED CLUTCH)

| RATIO SPREAD | 5.35 |
|---|---|
| RATIO STEPS | |
| REV/1 | -0.95 |
| 1/2 | 1.47 |
| 2/3 | 1.82 |
| 3/4 | 1.45 |
| 4/5 | 1.38 |

SAMPLE DESIGN:

$\frac{\text{RING GEAR}}{\text{SUN GEAR}}$ TOOTH RATIO: $\frac{N_{R1}}{N_{S1}} = 2.98$  $\frac{N_{R2}}{N_{S2}} = 1.53$  $\frac{N_{R3}}{N_{S3}} = 2.63$

MULTI-SPEED TRANSMISSIONS WITH A LONG PINION AND ONE FIXED INTERCONNECTION

TECHNICAL FIELD

The present invention relates to a family of power transmissions having three planetary gear sets that are controlled by up to seven torque-transmitting devices to provide at least five forward speed ratios and at least one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978; and U.S. Pat. No. 6,422,969 issued to Raghavan and Usoro on Jul. 23, 2002.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five or six-speed devices due to the size and complexity of these transmissions.

Seven-speed transmissions are disclosed in U.S. Pat. No. 6,623,397 issued to Raghavan, Bucknor and Usoro. Eight speed transmissions are disclosed in U.S. Pat. No. 6,425,841 issued to Haka. The Haka transmission utilizes three planetary gear sets and six torque transmitting devices, including two brakes and two clutches, to provide eight forward speed ratios and a reverse speed ratio. One of the planetary gear sets is positioned and operated to establish two fixed speed input members for the remaining two planetary gear sets. Seven-, eight- and nine-speed transmissions provide further improvements in acceleration and fuel economy over six-speed transmissions. However, like the six-speed transmissions discussed above, the development of seven-, eight- and nine-speed transmissions has been precluded because of complexity, size and cost.

SUMMARY OF THE INVENTION

It is an object of the present invention to provide an improved family of transmissions having three planetary gear sets controlled to provide at least five forward speed ratios and at least one reverse speed ratio.

In one aspect of the present invention, the family of transmissions has three planetary gear sets, each of which includes a first, second and third member, which members may comprise a sun gear, a ring gear, a planet carrier assembly member, or a pinion, in any order.

In referring to the first, second and third gear sets in this description and in the claims, these sets may be counted "first" to "third" in any order in the drawings (i.e., left to right, right to left, etc.).

In another aspect of the present invention, the planetary gear sets may be of the single pinion-type or of the double pinion-type.

In yet another aspect of the present invention, a first member of the first or second planetary gear set is continuously interconnected with a first member of the third planetary gear set or with a stationary member by a first interconnecting member.

In another aspect of the present invention, the planet carrier assembly member of the first planetary gear set is continuously connected with the planet carrier assembly member of the second planetary gear set. This connection is referred to herein as a second interconnecting member.

In yet another aspect of the present invention, the first and second planetary gear set are continuously connected via long pinion gears. This connection is referred to herein as a third interconnecting member.

The interconnecting members may be multi-piece rigid connections, single piece rigid connections, shared ring gears, shared carriers, shared sun gears, long pinions, such as in a Ravigneax gear set, or other suitable devices.

In yet a further aspect of the invention, each family member incorporates an output shaft which is continuously connected with at least one member of the planetary gear sets. The input shaft may be continuously connected with any member of the planetary gear sets or selectively connectable with at least one member of the planetary gear sets through a torque-transmitting mechanism (torque transfer device).

In still a further aspect of the invention, a first torque-transmitting mechanism, such as a clutch, selectively connects a member of the first or second planetary gear set with a member of the third planetary gear set or with the input shaft.

In another aspect of the invention, a second torque-transmitting mechanism, such as a clutch, selectively connects a member of the third planetary gear set with a member of the first or second planetary gear set or with the input shaft, this pair being different from the one connected by the first torque-transmitting mechanism.

In a still further aspect of the invention, a third torque-transmitting mechanism, such as a clutch, selectively connects a member of the first or second planetary gear set with a member of the third planetary gear set. Alternatively, a third torque-transmitting mechanism, such as a brake, selectively connects a member of the first or second planetary gear set with a stationary member (transmission housing/casing).

In a still further aspect of the invention, a fourth torque-transmitting mechanism, such as a clutch, selectively connects a member of the first or second planetary gear set with a member of the third planetary gear set. Alternatively, a fourth torque-transmitting mechanism, such as a brake, selectively connects a member of the first or second planetary gear set with a stationary member (transmission housing/casing).

In a still further aspect of the invention, an optional fifth torque-transmitting mechanism, such as a clutch, selectively connects a member of the third planetary gear set with a member of the first or second planetary gear set. Alternatively, an optional fifth torque-transmitting mechanism, such as a brake, selectively connects a member of the third planetary gear set with a stationary member (transmission housing/casing).

In still another aspect of the invention, an optional sixth torque-transmitting mechanism, such as a clutch, selectively connects a member of the first, second or third planetary gear set with another member of the first or second planetary gear set. Alternatively, an optional sixth torque-transmitting mechanism, such as a brake, selectively connects a member of the first, second or third planetary gear set with a stationary member (transmission housing/casing).

In still another aspect of the invention, an optional seventh torque-transmitting mechanism, such as a clutch, selectively connects a member of the first, second or third planetary gear set with the input shaft or with another member of the first or second planetary gear set.

In still another aspect of the invention, the up to seven torque-transmitting mechanisms are selectively engageable in combinations to yield at least five forward speed ratios and at least one reverse speed ratio.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIG. 1a is a schematic representation of a powertrain including a planetary transmission incorporating a family member of the present invention;

FIG. 1b is a truth table and chart depicting some of the operating characteristics of the powertrain shown in FIG. 1a;

FIG. 2a is a schematic representation of a powertrain having a planetary transmission incorporating another family member of the present invention;

FIG. 2b is a truth table and chart depicting some of the operating characteristics of the powertrain shown in FIG. 2a;

FIG. 3a is a schematic representation of a powertrain having a planetary transmission incorporating another family member of the present invention;

FIG. 3b is a truth table and chart depicting some of the operating characteristics of the powertrain shown in FIG. 3a;

FIG. 4a is a schematic representation of a powertrain having a planetary transmission incorporating another family member of the present invention;

FIG. 4b is a truth table and chart depicting some of the operating characteristics of the powertrain shown in FIG. 4a;

FIG. 5a is a schematic representation of a powertrain having a planetary transmission incorporating another family member of the present invention;

FIG. 5b is a truth table and chart depicting some of the operating characteristics of the powertrain shown in FIG. 5a;

FIG. 6a is a schematic representation of a powertrain having a planetary transmission incorporating another family member of the present invention;

FIG. 6b is a truth table and chart depicting some of the operating characteristics of the powertrain shown in FIG. 6a;

FIG. 7a is a schematic representation of a powertrain having a planetary transmission incorporating another family member of the present invention;

FIG. 7b is a truth table and chart depicting some of the operating characteristics of the powertrain shown in FIG. 7a;

FIG. 8a is a schematic representation of a powertrain having a planetary transmission incorporating another family member of the present invention;

FIG. 8b is a truth table and chart depicting some of the operating characteristics of the powertrain shown in FIG. 8a;

FIG. 9a is a schematic representation of a powertrain having a planetary transmission incorporating another family member of the present invention;

FIG. 9b is a truth table and chart depicting some of the operating characteristics of the powertrain shown in FIG. 9a;

FIG. 10a is a schematic representation of a powertrain having a planetary transmission incorporating another family member of the present invention;

FIG. 10b is a truth table and chart depicting some of the operating characteristics of the powertrain shown in FIG. 10a;

FIG. 11a is a schematic representation of a powertrain having a planetary transmission incorporating another family member of the present invention; and FIG. 11b is a truth table and chart depicting some of the operating characteristics of the powertrain shown in FIG. 11a.

DETAILED DESCRIPTION OF THE PREFERRED EMBODIMENTS

Figures 1A, 1B:
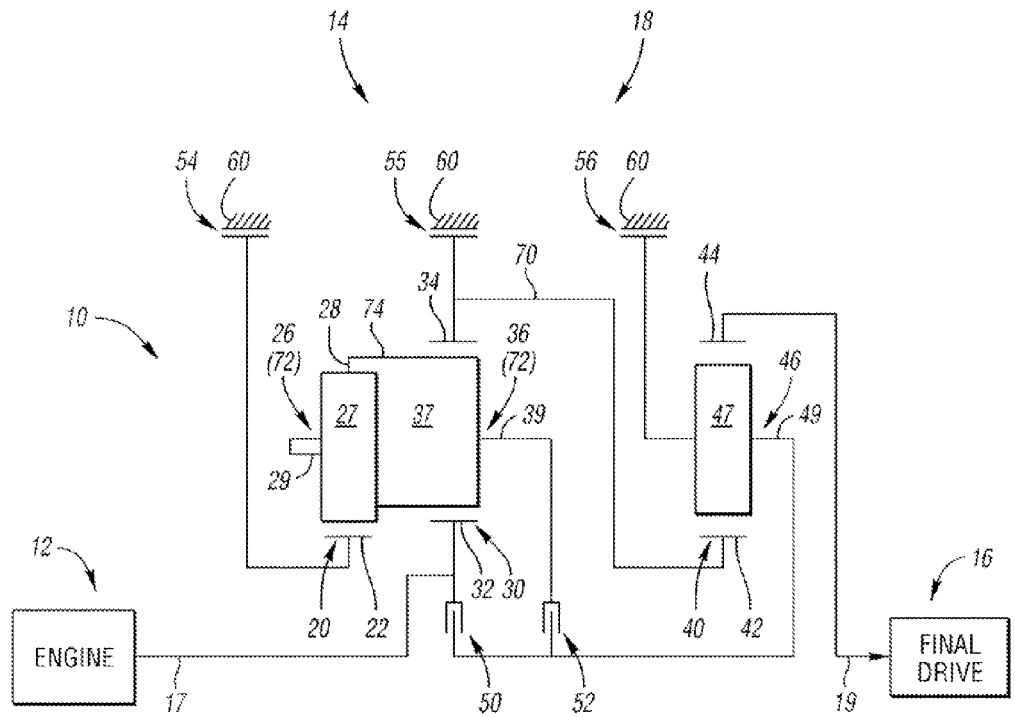

Referring to the drawings, wherein like characters represent the same or corresponding parts throughout the several views, there is shown in FIG. 1a a powertrain 10 having a conventional engine 12, a planetary transmission 14, and a conventional final drive mechanism 16.

The planetary transmission 14 includes an input shaft 17 connected with the engine 12, a planetary gear arrangement 18, and an output shaft 19 continuously connected with the final drive mechanism 16. The planetary gear arrangement 18 includes three planetary gear sets 20, 30 and 40.

The planetary gear set 20 includes a sun gear member 22 and a planet carrier assembly member 26. The planet carrier assembly member 26 includes a plurality of pinion gears 27, 28 rotatably mounted on a carrier member 29. The pinion gears 27 are disposed in meshing relationship with both the sun gear member 22 and the respective pinion gear 28.

The planetary gear set 30 includes a sun gear member 32, a ring gear member 34, and a planet carrier assembly member 36. The planet carrier assembly member 36 includes a plurality of long pinion gears 37 rotatably mounted on a carrier member 39 and disposed in meshing relationship with both the sun gear member 32 and the ring gear member 34. The planet carrier assembly member 36 is integral with the planet carrier assembly member 26. The pinion gears 37 are integral with the pinion gears 28 (i.e., they are formed by long pinion gears).

The planetary gear set 40 includes a sun gear member 42, a ring gear member 44, and a planet carrier assembly member 46. The planet carrier assembly member 46 includes a plurality of pinion gears 47 rotatably mounted on a carrier member 49, wherein the pinion gears 47 are disposed in meshing relationship with both the sun gear member 42 and the ring gear member 44.

The planetary gear arrangement also includes five torque-transmitting mechanisms 50, 52, 54, 55 and 56. The torque-transmitting mechanisms 50 and 52 are rotating-type torque-transmitting mechanisms, commonly termed clutches. The torque-transmitting mechanisms 54, 55 and 56 are stationary-type torque transmitting mechanisms, commonly termed brakes or reaction clutches.

The input shaft 17 is continuously connected with the sun gear member 32. The output shaft 19 is continuously connected with the ring gear member 44. The ring gear member 34 is continuously connected with the sun gear member 42 through the interconnecting member 70. The integral connection of the planet carrier assembly members 26 and 36 is referred to herein as the second interconnecting member 72. The integral connection of the long pinion gears 28, 37 is referred to herein as the third interconnecting member 74.

The sun gear member 32 is selectively connectable with the planet carrier assembly member 46 through the clutch 50. The planet carrier assembly member 36 is selectively connectable with the planet carrier assembly member 46 through the clutch 52. The sun gear member 22 is selectively connectable with the transmission housing 60 through the brake 54. The ring gear member 34 is selectively connectable with the transmission housing through brake 55. The planet carrier assembly member 46 is selectively connectable with the transmission housing 60 through the brake 56. The ring gear member 44 is continuously connected with the output shaft 19.

As shown in FIG. 1b, and in particular the truth table disclosed therein, the torque-transmitting mechanisms are selectively engaged in combinations of two to provide six forward speed ratios and one reverse speed ratio.

The reverse speed ratio is established with the engagement of the brakes 54 and 56. The brake 54 connects the sun gear member 22 with the transmission housing 60. The brake 56 connects the planet carrier assembly member 46 with the transmission housing 60. The sun gear member 22 does not rotate. The sun gear member 32 rotates at the same speed as the input shaft 17. The ring gear member 34 and the sun gear member 42 rotate at the same speed. The speed of the ring gear member 34 is determined from the speed of the sun gear member 32, the speed of the planet carrier assembly member 36 and the ring gear/sun gear tooth ratio of the planetary gear sets 20 and 30. The planet carrier assembly member 46 does not rotate. The ring gear member 44 and the output shaft 19 rotate at the same speed. The speed of the ring gear member 44, and therefore the output shaft 19, is determined from the speed of the sun gear member 42 and the ring gear/sun gear tooth ratio of the planetary gear set 40. The numerical value of the reverse speed ratio is determined utilizing the ring gear/sun gear tooth ratios of the planetary gear sets 20, 30 and 40.

The first forward speed ratio is establish with the engagement of the clutch 52 and the brake 56. The clutch 52 connects the planet carrier assembly member 36 with the planet carrier assembly member 46. The brake 56 connects the planet carrier assembly member 46 with the transmission housing 60. The sun gear member 32 rotates at the same speed as the input shaft 17. The planet carrier assembly members 26, 36 and 46 do not rotate. The ring gear member 34 rotates at the same speed as the sun gear member 42. The speed of the ring gear member 34 is determined from the speed of the sun gear member 32 and the ring gear/sun gear tooth ratio of the planetary gear set 30. The ring gear member 44 rotates at the same speed as the output shaft 19. The speed of the ring gear member 44, and therefore the output shaft 19, is determined from the speed of the sun gear member 42 and the ring gear/sun gear tooth ratio of the planetary gear set 40. The numerical value of the first forward speed ratio is determined utilizing the ring gear/sun gear tooth ratios of the planetary gear sets 20, 30 and 40.

The second forward speed ratio is established with the engagement of the clutch 52 and brake 55. The clutch 52 connects the planet carrier assembly member 36 with the planet carrier assembly member 46. The brake 55 connects the ring gear member 34 with the transmission housing 60. The sun gear member 32 rotates at the same speed as the input shaft 17. The planet carrier assembly members 26, 36 and 46 rotate at the same speed. The ring gear member 34 and the sun gear member 42 do not rotate. The speed of the planet carrier assembly member 36 is determined from the speed of the sun gear member 32 and the ring gear/sun gear tooth ratio of the planetary gear set 30. The ring gear member 44 rotates at the same speed as the output shaft 19. The ring gear member 44, and therefore the output shaft 19, rotates at a speed determined from the speed of the planet carrier assembly member 46 and the ring gear/sun gear tooth ratio of the planetary gear set 40. The numerical value of the second forward speed ratio is determined utilizing the ring gear/sun gear tooth ratios of the planetary gear sets 30 and 40.

The third forward speed ratio is established with the engagement of the clutch 52 and the brake 54. The clutch 52 connects the planet carrier assembly member 36 with the planet carrier assembly member 46. The brake 54 connects the sun gear member 22 with the transmission housing 60. The sun gear member 22 does not rotate. The planet carrier assembly members 26, 36 and 46 rotate at the same speed. The sun gear member 32 rotates at the same speed as the input shaft 17. The ring gear member 34 and the sun gear member 42 rotate at the same speed. The speed of the ring gear member 34 is determined from the speed of the sun gear member 32, the speed of the planet carrier assembly member 36 and the ring gear/sun gear tooth ratios of the planetary gear sets 20 and 30. The ring gear member 44 rotates at the same speed as the output shaft 19. The ring gear member 44, and therefore the output shaft 19, rotates at a speed determined from the speed of the planet carrier assembly member 46, the speed of the sun gear member 42, and the ring gear/sun gear tooth ratio of the planetary gear set 40. The numerical of the third forward speed ratio is determined utilizing the ring gear/sun gear tooth ratios of the planetary gear sets 20, and 40.

The fourth forward speed ratio is established with the engagement of the clutches 50 and 52. In this configuration, the input shaft 17 is connected in a direct drive relationship with the output shaft 19. The numerical value of the fourth forward ratio is 1.

The fifth forward speed ratio is established with the engagement of the clutch 50 and the brake 54. The clutch 50 connects the sun gear member 32 with the planet carrier assembly member 46. The brake 54 connects the sun gear member 22 with the transmission housing 60. The sun gear member 32 and planet carrier assembly member 46 rotate at the same speed as the input shaft 17. The ring gear member 34 rotates at the same speed as the sun gear member 42. The speed of the ring gear member 34 is determined from the speed of the sun gear member 32, the speed of the planet carrier assembly member 36 and the ring gear/sun gear tooth ratios of the planetary gear sets 20 and 30. The ring gear member 44 rotates at the same speed as the output shaft 19. The speed of the ring gear member 44, and therefore the output shaft 19, is determined from the speed of the sun gear member 42, the speed of the planet carrier assembly member 46 and the ring gear/sun gear tooth ratio of the planetary gear set 40. The numerical value of the fifth forward speed ratio is determined utilizing the ring gear/sun gear tooth ratios of the planetary gear sets 20, 30 and 40.

The sixth forward speed ratio is established with the engagement with the clutch 50 and the brake 55. The clutch 50 connects the sun gear member 32 with the planet carrier assembly member 46. The brake 55 connects the ring gear member 34 with the transmission housing 60. The sun gear member 32 and the planet carrier assembly member 46 rotate at the same speed as the input shaft 17. The planet carrier assembly members 26 and 36 rotate at the same speed. The ring gear member 34 and sun gear member 42 do not rotate. The speed of the planet carrier assembly member 36 is determined from the speed of the sun gear member 32 and the ring gear/sun gear tooth ratio of the planetary gear set 30. The ring gear member 44 rotates at the same speed as the output shaft 19. The ring gear member 44, and therefore the output shaft 19, rotates at a speed determined from the speed of the planet carrier assembly member 46, the speed of the sun gear 42, and the ring gear/sun gear tooth ratio of the planetary gear set 40. The numerical value of the sixth forward speed ratio is determined utilizing the ring gear/sun gear tooth ratios of the planetary gear sets 30 and 40.

As set forth above, the engagement schedule for the torque-transmitting mechanisms is shown in the truth table of FIG. 1b. This truth table also provides an example of speed ratios that are available utilizing the ring gear/sun gear tooth ratios given by way of example in FIG. 1b. The $N_{R1}/N_{S1}$ value is the tooth ratio of the planetary gear set 20; the $N_{R2}/N_{S2}$ value is the tooth ratio of the planetary gear set 30; and the $N_{R3}/N_{S3}$ value is the tooth ratio of the planetary gear set 40. Also, the chart of FIG. 1b describes the ratio steps that are attained utilizing the sample of tooth ratios given. For example, the step ratio between the first and second forward speed ratios is 1.85, while the step ratio between the reverse and first forward ratio is −1:18.

Figures 2A, 2B:
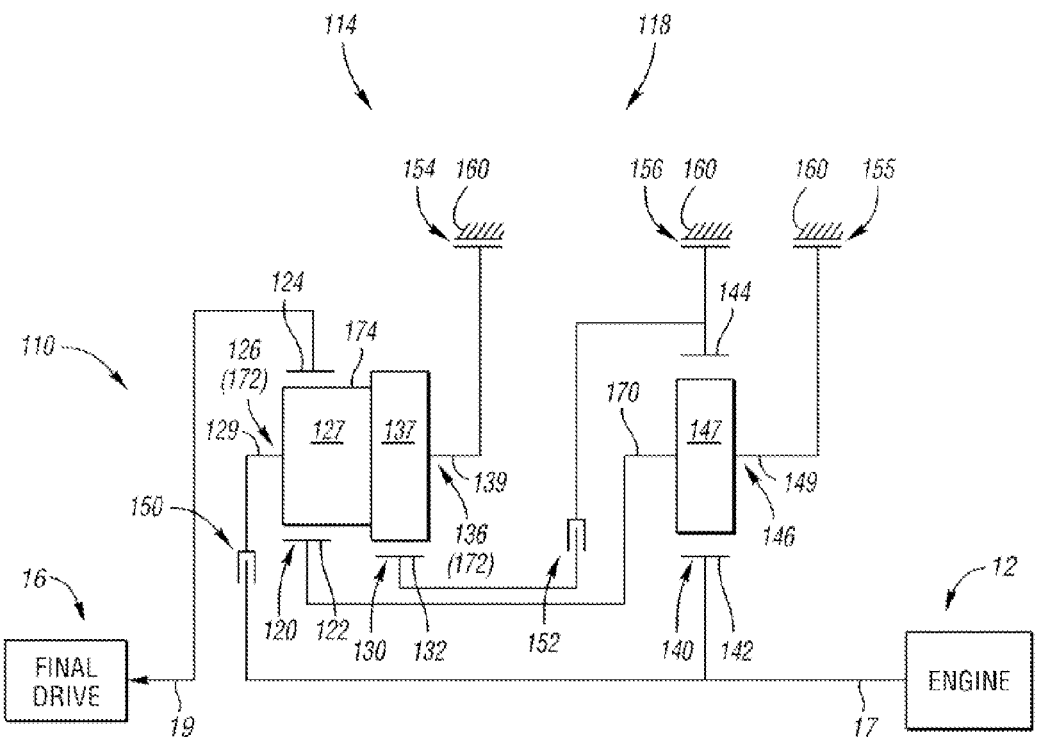

FIG. 2a shows a powertrain 110 having a conventional engine 12, a planetary transmission 114, and a conventional final drive mechanism 16.

The planetary transmission 114 includes an input shaft 17 continuously connected with the engine 12, a planetary gear arrangement 118, and an output shaft 19 continuously connected with the final drive mechanism 16. The planetary gear arrangement 118 includes three planetary gear sets 120, 130 and 140.

The planetary gear set 120 includes a sun gear member 122, a ring gear member 124, and a planet carrier assembly 126. The planet carrier assembly member 126 includes a plurality of pinion gears 127 rotatably mounted on a carrier member 129 and disposed in meshing relationship with both the ring gear member 124 and the sun gear member 122.

The planetary gear set 130 includes a sun gear member 132 and a planet carrier assembly member 136. The planet carrier assembly member 136 includes a plurality of pinion gears 137 rotatably mounted on a carrier member 139. The pinion gears 137 are disposed in meshing relationship with both the sun gear member 132 and are integrally connected with the pinion gears 127 (i.e., they are formed by long pinion gears). The planet carrier assembly member 136 is continuously connected with (integral with) the planet carrier assembly member 126.

The planetary gear set 140 includes a sun gear member 142, a ring gear member 144, and a planet carrier assembly member 146. The planet carrier assembly member 146 includes a plurality of pinion gears 147 rotatably mounted on a carrier member 149 and disposed in meshing relationship with both the sun gear member 142 and the ring gear member 144.

The planetary gear arrangement 118 also includes five torque-transmitting mechanisms 150, 152, 154, 155 and 156. The torque-transmitting mechanisms 150 and 152 are rotating-type torque-transmitting mechanisms, commonly termed clutches. The torque-transmitting mechanisms 154, 155 and 156 are stationary-type torque transmitting mechanisms, commonly termed brakes or reaction clutches.

The input shaft 17 is continuously connected with the sun gear member 142. The output shaft 19 is continuously connected with the ring gear member 124. The sun gear member 122 is continuously connected with the planet carrier assembly member 146 through the interconnecting member 170. The integral connection of the planet carrier assembly members 126, 136 is referred to herein as interconnecting member 172. The integral connection of the pinion gears 127, 137 is referred to herein as interconnecting member 174.

The planet carrier assembly member 126 is selectively connectable with the sun gear member 142 through the clutch 150. The sun gear member 132 is selectively connectable with the ring gear member 144 through the clutch 152. The planet carrier assembly member 136 is selectively connectable with the transmission housing 160 through the brake 154. The planet carrier assembly member 146 is selectively connectable with the transmission housing 160 through the brake 155. The ring gear member 144 is selectively connectable with the transmission housing 160 through the brake 156.

The truth table of FIG. 2b describes the engagement sequence utilized to provide six forward speed ratios and one reverse speed ratio in the planetary gear arrangement 118 shown in FIG. 2a.

The truth tables given in FIGS. 2b, 3b, 4b, 5b, 6b, 7b, 8b, 9b, 10b and 11b show the engagement sequences for the torque-transmitting mechanisms to provide at least five forward speed ratios and at least one reverse ratio. As shown and described above for the configuration in FIG. 1a, those skilled in the art will understand from the respective truth tables how the speed ratios are established through the planetary gear sets identified in the written description.

As set forth above, the truth table of FIG. 2b describes the engagement sequence of the torque-transmitting mechanisms utilized to provide the reverse drive ratios and six forward speed ratios. The truth table also provides an example of the ratios that can be attained with the family members shown in FIG. 2a utilizing the sample tooth ratios given in FIG. 2b. The $N_{R1}/N_{S1}$ value is the tooth ratio of the planetary gear set 120; the $N_{R2}/N_{S2}$ value is the tooth ratio of the planetary gear set 130; and the $N_{R3}/N_{S3}$ value is the tooth ratio of the planetary gear set 140. Also shown in FIG. 2b are the ratio steps between single step ratios in the forward direction as well as the reverse to first step ratio. For example, the first to second step ratio is 1.88.

Figures 3A, 3B:
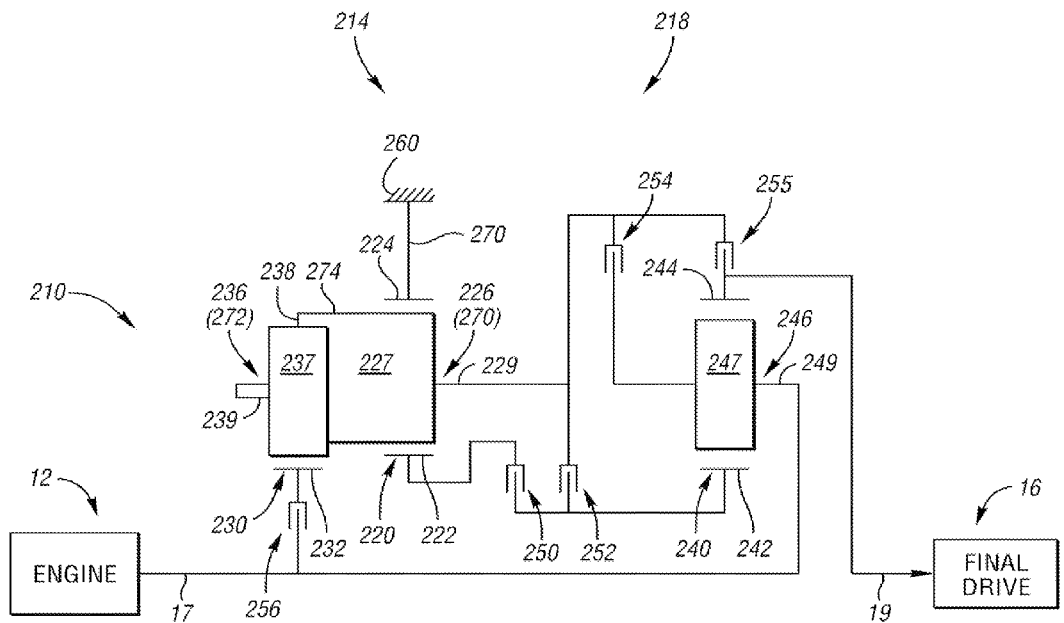

Turning to FIG. 3a, a powertrain 210 includes the engine 12, a planetary transmission 214, and a final drive mechanism 16. The planetary transmission 214 includes an input shaft 17 continuously connected with the engine 12, a planetary gear arrangement 218, and an output shaft 19 continuously connected with the final drive mechanism 16. The planetary gear arrangement 218 includes three planetary gear sets 220, 230 and 240.

The planetary gear set 220 includes a sun gear member 222, a ring gear member 224, and a planet carrier assembly 226. The planet carrier assembly member 226 includes a plurality of pinion gears 227 rotatably mounted on a carrier member 229 and disposed in meshing relationship with both the sun gear member 222 and the ring gear member 224.

The planetary gear set 230 includes a sun gear member 232 and a planet carrier assembly member 236. The planet carrier assembly member 236 includes a plurality of pinion gears 237, 238 rotatably mounted on a carrier member 239. The pinion gears 237 are disposed in meshing relationship with both the sun gear member 232 and the respective pinion gear 238. The pinion gears 238 are integral with the pinion gears 227 (i.e., formed by long pinions). The planet carrier assembly member 226 is continuously connected with (integral with) the planet carrier assembly member 236.

The planetary gear set 240 includes a sun gear member 242, a ring gear member 244, and a planet carrier assembly member 246. The planet carrier assembly member 246 includes a plurality of pinion gears 247 rotatably mounted on a carrier member 249 and disposed in meshing relationship with both the sun gear member 242 and with the ring gear member 244.

The planetary gear arrangement 218 also includes five torque-transmitting mechanisms 250, 252, 254, 255 and 256. The torque-transmitting mechanisms 250, 252, 254, 255 and 256 are rotating type torque-transmitting mechanisms, commonly termed clutches.

The input shaft 17 is continuously connected with planet carrier assembly member 246. The output shaft 19 is continuously connected with the ring gear member 244. The ring gear member 224 is continuously connected with the transmission housing 260 through the interconnecting member 270. The integral connection of the planet carrier assembly members 226, 236 is referred to herein as interconnecting member 272. The integral connection of the pinion gears 227, 238 is referred to herein as interconnecting member 274.

The sun gear member 222 is selectively connectable with the sun gear member 242 through the clutch 250. The planet carrier assembly member 226 is selectively connectable with the sun gear member 242 through the clutch 252. The planet carrier assembly member 226 is selectively connectable with the planet carrier assembly member 246 through the clutch 254. The sun gear member 232 is selectively connectable with the planet carrier assembly member 246 through the clutch 256.

As shown in the truth table in FIG. 3b, the torque-transmitting mechanisms are engaged in combinations of two to establish six forward speed ratios and one reverse speed ratios.

As previously set forth, the truth table of FIG. 3b describes the combinations of engagements utilized for the forward and reverse speed ratios. The truth table also provides an example of speed ratios that are available with the family member described above. These examples of speed ratios are determined utilizing the tooth ratios given in FIG. 3b. The $N_{R1}/N_{S1}$ value is the tooth ratio of the planetary gear set 220; the $N_{R1}/N_{S2}$ value is the tooth ratio of the planetary gear set 230; and the $N_{R3}/N_{S3}$ value is the tooth ratio of the planetary gear set 240. Also depicted in FIG. 3b is a chart representing the ratio steps between adjacent forward speed ratios and between the first and reverse speed ratio. For example, the first to second ratio interchange has a step of 1.87.

Figures 4A, 4B:
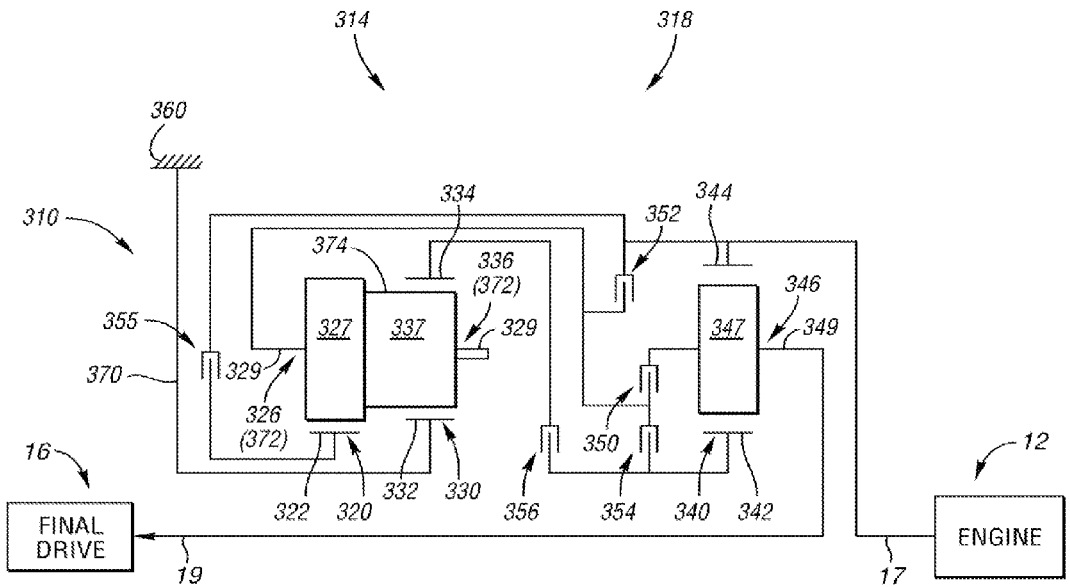

A powertrain 310, shown in FIG. 4a, includes the engine 12, a planetary transmission 314, and the final drive mechanism 16. The planetary transmission 314 includes an input shaft 17 continuously connected with the engine 12, a planetary gear arrangement 318, and an output shaft 19 continuously connected with the final drive mechanism 16. The planetary gear arrangement 318 includes three planetary gear sets 320, 330 and 340.

The planetary gear set 320 includes a sun gear member 322 and a planet carrier assembly member 326. The planet carrier assembly member 326 includes a plurality of pinion gears 327 rotatably mounted on a carrier member 329. The pinion gears 327 are disposed in meshing relationship with both the sun gear member 322.

The planetary gear set 330 includes a sun gear member 332, a ring gear member 334, and a planet carrier assembly member 336. The planet carrier assembly member 336 includes a plurality of pinion gears 337 rotatably mounted on a carrier member 339 and disposed in meshing relationship with both the sun gear member 332 and the ring gear member 334. The pinion gears 337 are integral with the pinion gears 327 (i.e., formed by long pinion gears). The planet carrier assembly member 326 is continuously connected with (integral with) the planet carrier assembly member 336.

The planetary gear set 340 includes a sun gear member 342, a ring gear member 344, and a planet carrier assembly member 346. The planet carrier assembly member 346 includes a plurality of pinion gears 347 rotatably mounted on a carrier member 349 and disposed in meshing relationship with both the sun gear member 342 and the ring gear member 344.

The planetary gear arrangement 318 also includes five torque-transmitting mechanisms 350, 352, 354, 355 and 356. The torque-transmitting mechanisms 350, 352, 354, 355 and 356 are rotating type torque-transmitting mechanisms, commonly termed clutches.

The input shaft 17 is continuously connected with the ring gear member 344. The output shaft 19 is continuously connected with the planet carrier assembly member 346. The sun gear member 332 is continuously connected with the transmission housing 360 through interconnecting member 370. The integral connection of the planet carrier assembly members 326, 336 is referred to herein as interconnecting member 372. The integral connection of the pinion gears 327, 337 is referred to herein as interconnecting member 374.

The planet carrier assembly member 326 is selectively connectable with the planet carrier assembly member 346 through the clutch 350. The planet carrier assembly member 326 is selectively connectable with the ring gear member 344 through the clutch 352. The planet carrier assembly member 326 is selectively connectable with the sun gear member 342 through the clutch 354. The sun gear member 322 is selectively connectable with the ring gear member 344 through the clutch 355. The ring gear member 334 is selectively connectable with the sun gear member 342 through the clutch 356.

The truth table shown in FIG. 4b describes the engagement combination and the engagement sequence necessary to provide the reverse drive ratio and six forward speed ratios. A sample of the numerical values for the ratios is also provided in the truth table of FIG. 4b. These values are determined utilizing the ring gear/sun gear tooth ratios also given in FIG. 4b. The $N_{R1}/N_{S1}$ value is the tooth ratio for the planetary gear set 320; the $N_{R2}/N_{S2}$ value is the tooth ratio for the planetary gear set 330; and the $N_{R3}/N_{S3}$ value is the tooth ratio for the planetary gear set 340. Also given in FIG. 4b is a chart describing the step ratios between the adjacent forward speed ratios and the reverse to first forward speed ratio. For example, the first to second forward speed ratio step is 1.43.

Figures 5A, 5B:
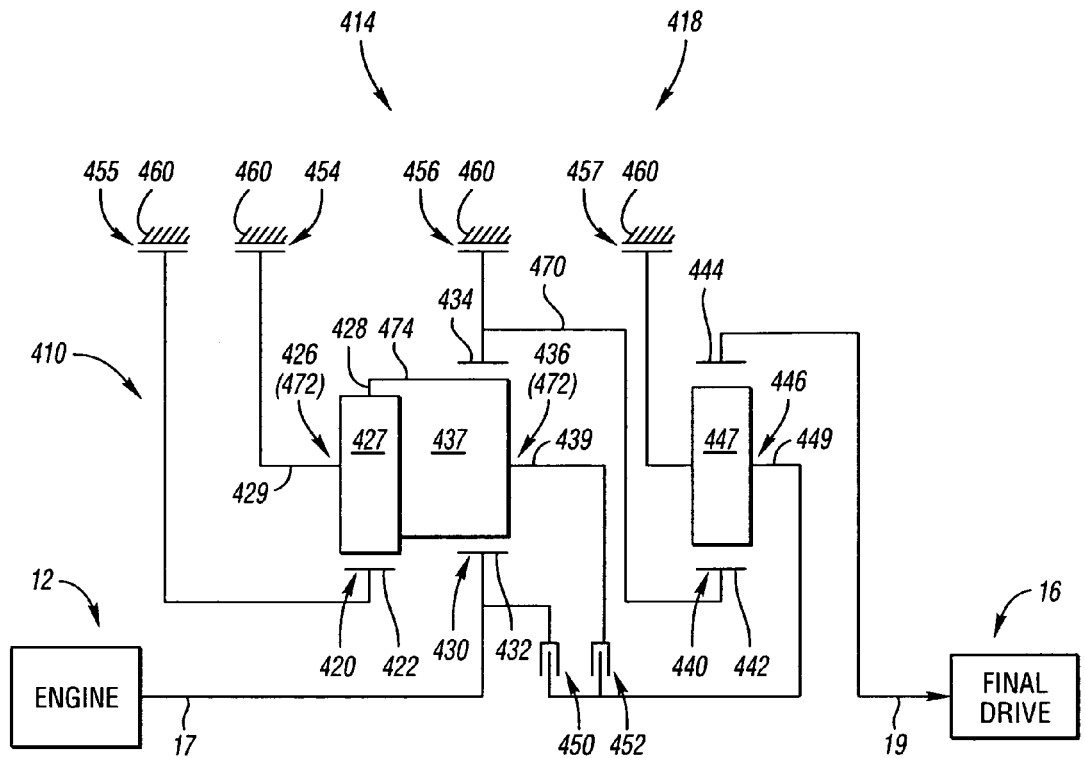

A powertrain 410, shown in FIG. 5a, includes the engine 12, a planetary transmission 414 and the final drive mechanism 16. The planetary transmission 414 includes a planetary gear arrangement 418, input shaft 17 and output shaft 19. The planetary gear arrangement 418 includes three simple planetary gear sets 420, 430 and 440.

The planetary gear set 420 includes a sun gear member 422 and a planet carrier assembly member 426. The planet carrier assembly 426 includes a plurality of pinion gears 427, 428 rotatably mounted on a carrier member 429. The pinion gears 427 are disposed in meshing relationship with both the sun gear member 422 and the respective pinion gear 428.

The planetary gear set 430 includes a sun gear member 432, a ring gear member 434, and a planet carrier assembly member 436. The planet carrier assembly member 436 includes a plurality of pinion gears 437 rotatably mounted on a carrier member 439 and disposed in meshing relationship with both the ring gear member 434 and the sun gear member 432. The pinion gears 437 are integral with the pinion gears 428 (i.e., formed by long pinions). The planet carrier assembly member 436 is continuously connected with (integral with) the planet carrier assembly member 426.

The planetary gear set 440 includes a sun gear member 442, a ring gear member 444, and a planet carrier assembly member 446. The planet carrier assembly member 446 includes a plurality of pinion gears 447 rotatably mounted on a carrier member 449 and disposed in meshing relationship with both the sun gear member 442 and the ring gear member 444.

The planetary gear arrangement 418 also includes six torque-transmitting mechanisms 450, 452, 454, 455, 456 and 457. The torque-transmitting mechanisms 450 and 452 are rotating type torque-transmitting mechanisms, commonly termed clutches. The torque-transmitting mechanisms 454, 455, 456 and 457 are stationary-type torque transmitting mechanisms, commonly termed brakes or reaction clutches.

The input shaft 17 is continuously connected with sun gear member 432. The output shaft 19 is continuously connected with the ring gear member 444. The ring gear member 434 is continuously connected with the sun gear member 442 through the interconnecting member 470. The integral connection of the planet carrier assembly members 426, 436 is referred to herein as interconnecting member 472. The integral connection of the pinion gears 428, 437 is referred to herein as interconnecting member 474.

The sun gear member 432 is selectively connectable with the planet carrier assembly member 446 through the clutch 450. The planet carrier assembly member 436 is selectively connectable with the planet carrier assembly member 446 through the clutch 452. The planet carrier assembly member 426 is selectively connectable with the transmission housing 460 through the brake 454. The sun gear member 422 is selectively connectable with the transmission housing 460 through the brake 455. The ring gear member 434 is selectively connectable with the transmission housing 460 through the brake 456. The planet carrier assembly member 446 is selectively connectable with the transmission housing 460 through the brake 457.

The truth table shown in FIG. 5b describes the engagement combination and sequence of the torque-transmitting mechanisms 450, 452, 454, 455, 456 and 457 that are employed to provide the forward and reverse drive ratios.

Also given in the truth table of FIG. 5b is a set of numerical values that are attainable with the present invention utilizing the ring gear/sun gear tooth ratios shown. The $N_{R1}/N_{S1}$ value is the tooth ratio of the planetary gear set 420; the $N_{R2}/N_{S2}$ value is the tooth ratio of the planetary gear set 430; and the $N_{R3}/N_{S3}$ value is the tooth ratio of the planetary gear set 440. FIG. 5b also provides a chart of the ratio steps between adjacent forward ratios and between the reverse and first forward ratio. For example, the ratio step between the first and second forward ratios is 1.95.

Figures 6A, 6B:
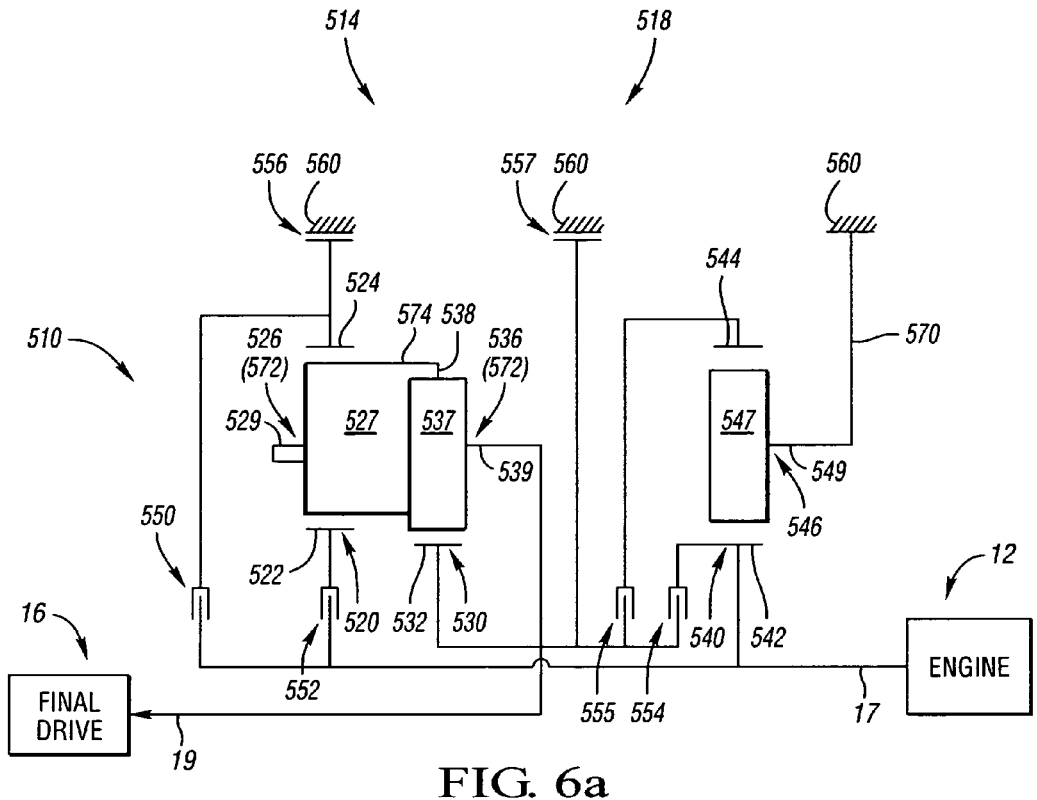

A powertrain 510, shown in FIG. 6a, includes an engine 12, a planetary gear transmission 514 and the final drive mechanism 16. The planetary transmission 514 includes the input shaft 17, a planetary gear arrangement 518 and the output shaft 19. The planetary gear arrangement 518 includes three planetary gear sets 520, 530 and 540.

The planetary gear set 520 includes a sun gear member 522, a ring gear member 524, and a planet carrier assembly 526. The planet carrier assembly member 526 includes a plurality of pinion gears 527 rotatably mounted on a carrier member 529 and disposed in meshing relationship with both the sun gear member 522 and the ring gear member 524.

The planetary gear set 530 includes a sun gear member 532 and a planet carrier assembly member 536. The planet carrier assembly member 536 includes a plurality of pinion gears 537, 538 rotatably mounted on a carrier member 539. The pinion gears 537 are disposed in meshing relationship with both the sun gear member 532 and the respective pinion gear 538. The planet carrier assembly member 536 is continuously connected with (integral with) the planet carrier assembly member 526. The pinion gears 527 are integral with pinion gears 538 (i.e., formed by long pinions).

The planetary gear set 540 includes a sun gear member 542, a ring gear member 544, and a planet carrier assembly member 546. The planet carrier assembly member 546 includes a plurality of pinion gears 547 rotatably mounted on a carrier member 549 and disposed in meshing relationship with both the sun gear member 542 and the ring gear member 544.

The planetary gear arrangement 518 also includes six torque-transmitting mechanisms 550, 552, 554, 555, 556 and 557. The torque-transmitting mechanisms 550, 552, 554 and 555 are rotating type torque-transmitting mechanisms, commonly termed clutches. The torque-transmitting mechanisms 556 and 557 are stationary-type torque transmitting mechanisms, commonly termed brakes or reaction clutches.

The input shaft 17 is continuously connected with sun gear member 542. The output shaft 19 is continuously connected with the planet carrier assembly member 536. The planet carrier assembly member 546 is continuously connected with the transmission housing 560 through the interconnecting member 570. The integral connection of the planet carrier assembly members 526, 536 is referred to herein as interconnecting member 572. The integral connection of the pinion gears 527, 538 is referred to herein as interconnecting member 574.

The ring gear member 524 is selectively connectable with the sun gear member 542 through the clutch 550. The sun gear member 522 is selectively connectable with the sun gear member 542 through the clutch 552. The sun gear member 532 is selectively connectable with the sun gear member 542 through the clutch 554. The sun gear member 532 is selectively connectable with the ring gear member 544 through the clutch 555. The ring gear member 524 is selectively connectable with the transmission housing 560 through the brake 556. The sun gear member 532 is selectively connectable with the transmission housing 560 through the brake 557.

The truth table shown in FIG. 6b describes the engagement sequence and combination of the torque-transmitting mechanisms to provide one reverse speed ratio and seven forward speed ratios. The sample speed ratios given in the truth table are determined utilizing the tooth ratio values also given in FIG. 6b. The $N_{R1}/N_{S1}$ value is the tooth ratio of the planetary gear set 520; the $N_{R2}/N_{S2}$ value is the tooth ratio of the planetary gear set 530; and the $N_{R3}/N_{S3}$ value is the tooth ratio of the planetary gear set 540. FIG. 6b also provides a chart of the ratio steps between adjacent forward ratios and between the reverse and first forward ratio. For example, the ratio step between the first and second forward ratios is 1.79.

Figures 7A, 7B:
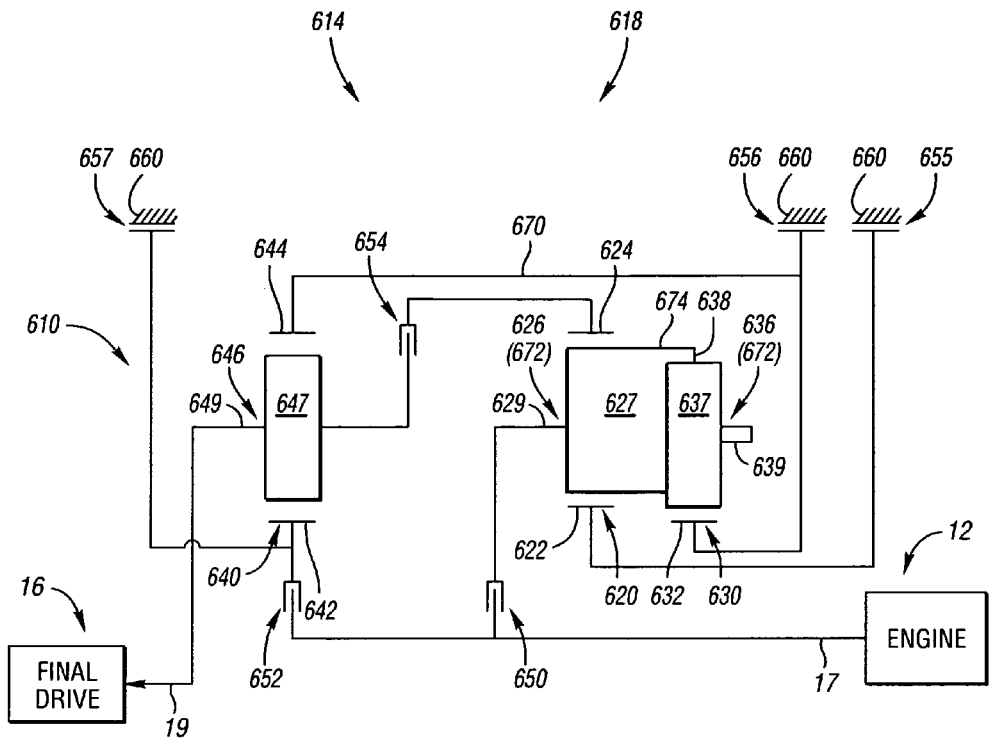

A powertrain 610, shown in FIG. 7a, has the engine 12, a planetary transmission 614 and the final drive mechanism 16.

The planetary transmission 614 includes the input shaft 17, a planetary gear arrangement 618 and the output shaft 19. The planetary gear arrangement 618 includes three planetary gear sets 620, 630 and 640.

The planetary gear set 620 includes a sun gear member 622, a ring gear member 624, and a planet carrier assembly 626. The planet carrier assembly 626 includes a plurality of pinion gears 627 rotatably mounted on a carrier member 629 and disposed in meshing relationship with both the sun gear member 622 and the ring gear member 624.

The planetary gear set 630 includes a sun gear member 632 and a planet carrier assembly member 636. The planet carrier assembly member 636 includes a plurality of pinion gears 637, 638 rotatably mounted on a carrier member 639. The pinion gears 637 are disposed in meshing relationship with both the sun gear member 632 and respective pinion gear 638. The planet carrier assembly member 636 is continuously connected with (integral with) the planet carrier assembly member 626. The pinion gears 627 are continuously connected with pinion gears 638 (i.e., formed by long pinion gears).

The planetary gear set 640 includes a sun gear member 642, a ring gear member 644, and a planet carrier assembly member 646. The planet carrier assembly member 646 includes a plurality of pinion gears 647 rotatably mounted on a carrier member 649 and disposed in meshing relationship with both the sun gear member 642 and the ring gear member 644.

The planetary gear arrangement 618 also includes six torque-transmitting mechanisms 650, 652, 654, 655, 656 and 657. The torque-transmitting mechanisms 650, 652 and 654 are rotating type torque-transmitting mechanisms, commonly termed clutches. The torque-transmitting mechanisms 655, 656 and 657 are stationary-type torque transmitting mechanisms, commonly termed brakes or reaction clutches.

The input shaft 17 is not continuously connected with any planetary gear member. The output shaft 19 is continuously connected with the planet carrier assembly member 646. The ring gear member 644 is continuously connected with the sun gear member 632 through the interconnecting member 670. The integral connection of the planet carrier assembly members 626, 636 is referred to herein as the interconnecting member 672. The integral connection of the pinion gears 627, 638 is referred to herein as the interconnecting member 674.

The carrier member 626 is selectively connectable with the input shaft 17 through the clutch 650. The sun gear member 642 is selectively connectable with the input shaft 17 through the clutch 652. The planet carrier assembly member 646 is selectively connectable with the ring gear member 624 through the clutch 654. The sun gear member 622 is selectively connectable with the transmission housing 660 through the brake 655. The sun gear member 632 is selectively connectable with the transmission housing 660 through the brake 656. The sun gear member 642 is selectively connectable with the transmission housing 660 through the brake 657.

The truth table shown in FIG. 7b describes the combination of torque-transmitting mechanism engagements that will provide one reverse drive ratio and seven forward speed ratios, as well as the sequence of these engagements and interchanges.

The ratio values given are by way of example and are established utilizing the ring gear/sun gear tooth ratios given in FIG. 7b. For example, the $N_{R1}/N_{S1}$ value is the tooth ratio of the planetary gear set 620; the $N_{R2}/N_{S2}$ value is the tooth ratio of the planetary gear set 630; and the $N_{R3}/N_{S3}$ value is the tooth ratio of the planetary gear set 640. The ratio steps between adjacent forward ratios and the reverse to first ratio are also given in FIG. 7b. For example, the ratio step between the first and second forward ratios is 1.98.

Figures 8A, 8B:
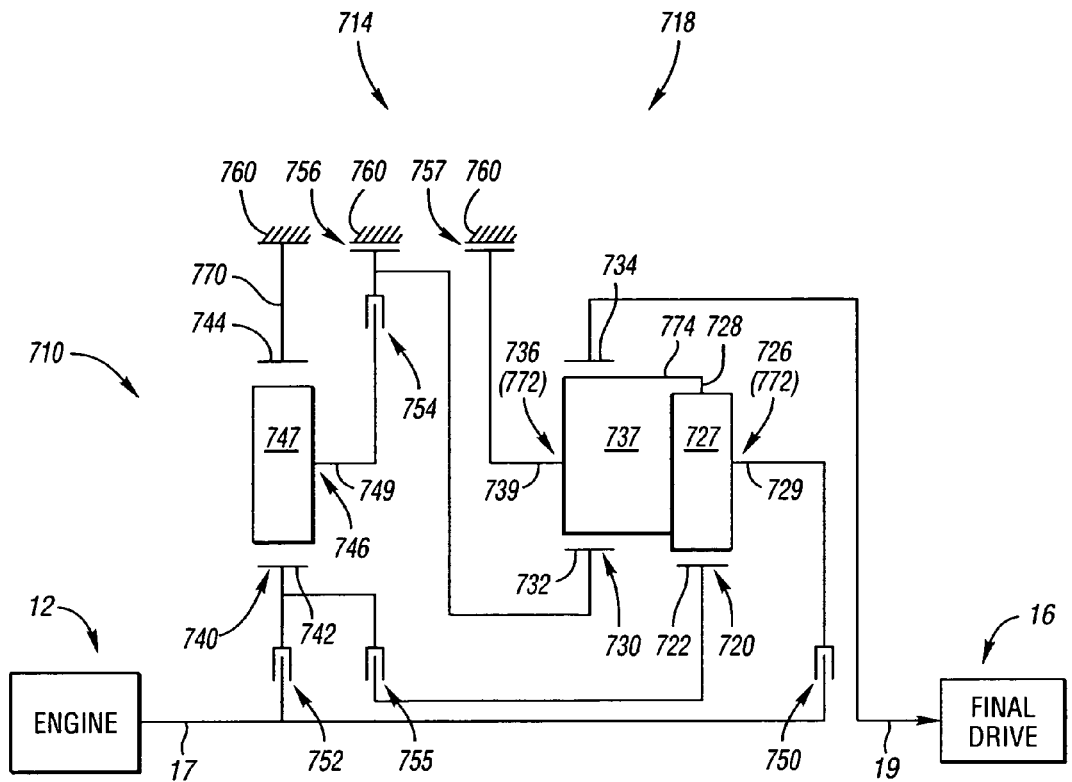

A powertrain 710, shown in FIG. 8a, has the conventional engine 12, a planetary transmission 714, and the conventional final drive mechanism 16. The engine 12 is drivingly connected with the planetary transmission 714 through the input shaft 17. The planetary transmission 714 is drivingly connected with the final drive mechanism 16 through the output shaft 19. The planetary transmission 714 includes a planetary gear arrangement 718 that has a first planetary gear set 720, a second planetary gear set 730, and a third planetary gear set 740.

The planetary gear set 720 includes a sun gear member 722 and a planet carrier assembly 726. The planet carrier assembly 726 includes a plurality of pinion gears 727, 728 rotatably mounted on a carrier member 729. The pinion gears 727 disposed in meshing relationship with both the sun gear member 722 and the respective pinion gear 728.

The planetary gear set 730 includes a sun gear member 732, a ring gear member 734, and a planet carrier assembly member 736. The planet carrier assembly member 736 includes a plurality of pinion gears 737 rotatably mounted on a carrier member 739 and disposed in meshing relationship with both the sun gear member 732 and the ring gear member 734. The pinion gears 737 are integral with pinion gears 728 (i.e., formed by long pinion gears). The planet carrier assembly member 726 is continuously connected with (integral with) the planet carrier assembly member 736.

The planetary gear set 740 includes a sun gear member 742, a ring gear member 744, and a planet carrier assembly member 746. The planet carrier assembly member 746 includes a plurality of pinion gears 747 rotatably mounted on a carrier member 749 and engaged with both the sun gear member 742 and the ring gear member 744.

The planetary gear arrangement 718 also includes six torque-transmitting mechanisms 750, 752, 754, 755, 756 and 757. The torque-transmitting mechanisms 750, 752, 754 and 755 are rotating type torque-transmitting mechanisms, commonly termed clutches. The torque-transmitting mechanisms 756 and 757 are stationary-type torque transmitting mechanisms, commonly termed brakes or reaction clutches.

The input shaft 17 is not continuously connected with any planetary gear member. The output shaft 19 is continuously connected with the ring gear member 734. The ring gear member 744 is continuously connected with the transmission housing 760 through the interconnecting member 770. The integral connection of the planet carrier assembly members 726, 736 is referred to herein as interconnecting member 772. The integral connection of the pinion gears 728, 737 is referred to herein as interconnecting member 774.

The planet carrier assembly member 726 is selectively connectable with the input shaft 17 through the clutch 750. The sun gear member 742 is selectively connectable with the input shaft 17 through the clutch 752. The planet carrier assembly member 746 is selectively connectable with the sun gear member 732 through the clutch 754. The sun gear member 742 is selectively connectable with the sun gear member 722 through the clutch 755. The sun gear member 732 is selectively connectable with the transmission housing 760 through the brake 756. The planet carrier assembly member 736 is selectively connectable with the transmission housing 760 through the brake 757.

The truth table of FIG. 8b defines the torque-transmitting mechanism engagement sequence utilized for each of the forward and reverse speed ratios. Also given in the truth table is a set of numerical values that are attainable with the present invention utilizing the ring gear/sun gear tooth ratios given in FIG. 8b. The $N_{R1}/N_{S1}$ value is the tooth ratio of the planetary gear set 720; the $N_{R2}/N_{S2}$ value is the tooth ratio of the planetary gear set 730; and the $N_{R3}/N_{S3}$ value is the tooth ratio of the planetary gear set 740.

FIG. 8b also provides a chart of the ratio steps between adjacent forward ratios and between the reverse and first forward ratio. For example, the ratio step between the first and second forward ratios is 1.88.

Figures 9A, 9B:
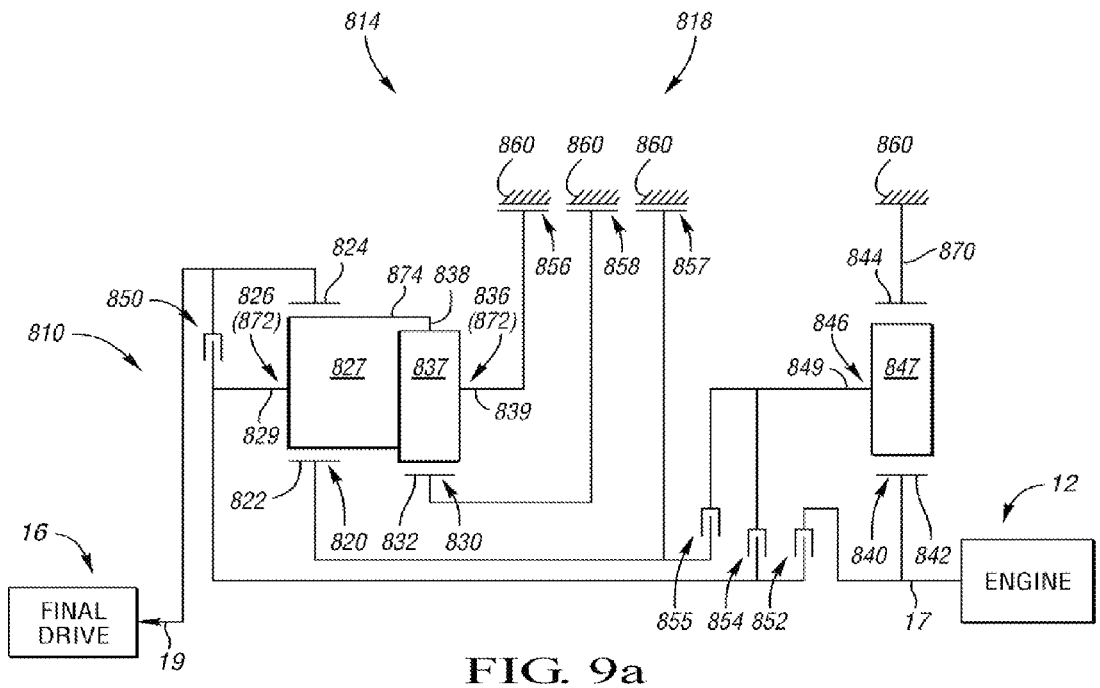

A powertrain 810, shown in FIG. 9a, has the conventional engine 12, a planetary transmission 814, and the final drive mechanism 16. The engine 12 is drivingly connected with the planetary transmission 814 through the input shaft 17. The planetary transmission 814 is drivingly connected with the final drive mechanism 16 through the output shaft 19. The planetary transmission 814 includes a planetary gear arrangement 818 that has a first planetary gear set 820, a second planetary gear set 830, and a third planetary gear set 840.

The planetary gear set 820 includes a sun gear member 822, a ring gear member 824, and a planet carrier assembly 826. The planet carrier assembly 826 includes a plurality of pinion gears 827 rotatably mounted on a carrier member 829 and disposed in meshing relationship with both the sun gear member 822 and the ring gear member 824.

The planetary gear set 830 includes a sun gear member 832 and a planet carrier assembly member 836. The planet carrier assembly member 836 includes a plurality of pinion gears 837, 838 rotatably mounted on a carrier member 839. The pinion gears 837 are disposed in meshing relationship with both the sun gear member 832 and the respective pinion gear 838. The planet carrier assembly member 836 is continuously connected with (integral with) the planet carrier assembly member 826. The pinion gears 838 are integral with pinion gears 827 (i.e. formed by long pinions).

The planetary gear set 840 includes a sun gear member 842, a ring gear member 844, and a planet carrier assembly member 846. The planet carrier assembly member 846 includes a plurality of pinion gears 847 rotatably mounted on a carrier member 849 and disposed in meshing relationship with both the ring gear member 844, and the sun gear member 842.

The planetary gear arrangement 818 also includes seven torque-transmitting mechanisms 850, 852, 854, 855, 856, 857 and 85. The torque-transmitting mechanisms 850, 852, 852 and 855 are rotating type torque-transmitting mechanisms, commonly termed clutches. The torque-transmitting mechanisms 856, 857 and 858 are stationary-type torque transmitting mechanisms, commonly termed brakes or reaction clutches.

The input shaft 17 is continuously connected with sun gear member 842. The output shaft 19 is continuously connected with the ring gear member 824. The ring gear member 844 is continuously connected with the transmission housing 860 through the interconnecting member 870. The integral connection of the planet carrier assembly members 826, 836 is referred to herein as interconnecting member 872. The integral connection of the pinion gears 838, 827 is referred to herein as interconnecting member 874.

The planet carrier assembly member 826 is selectively connectable with the ring gear member 824 through the clutch 850. The planet carrier assembly member 826 is selectively connectable with the sun gear member 842 through the clutch 852. The planet carrier assembly member 826 is selectively connectable with the planet carrier assembly member 846 through the clutch 854. The sun gear member 822 is selectively connectable with the planet carrier assembly member 846 through the clutch 855. The planet carrier assembly member 836 is selectively connectable with the transmission housing 860 through the brake 856. The sun gear member 822 is selectively connectable with the transmission housing 860 through the brake 857. The sun gear member 832 is selectively connectable with the transmission housing 860 through the brake 858.

The truth table shown in FIG. 9b defines the torque-transmitting mechanism engagement sequence that provides one reverse speed ratio and eight forward speed ratios shown in the truth table and available with the planetary gear arrangement 818. A sample of numerical values for the individual ratios is also given in the truth table of FIG. 9b. These numerical values have been calculated using the ring gear/sun gear tooth ratios also given by way of example in FIG. 9b. The $N_{R1}/N_{S1}$ value is the tooth ratio of the planetary gear set 820; the $N_{R2}/N_{S2}$ value is the tooth ratio of the planetary gear set 830; and the $N_{R3}/N_{S3}$ value is the tooth ratio of the planetary gear set 840. FIG. 9b also describes the ratio steps between adjacent forward ratios and between the reverse and first forward ratio. For example, the ratio step between the first and second forward ratios is 1.44.

Figures 10A, 10B:
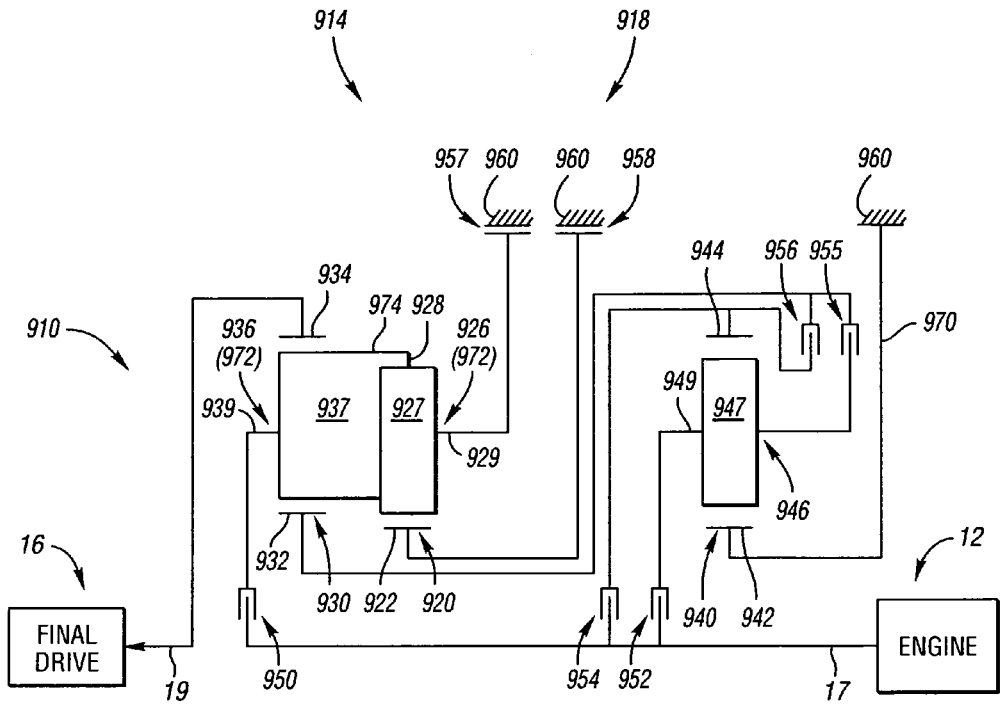

The powertrain 910, shown in FIG. 10a, includes the conventional engine 12, a planetary transmission 914, and the conventional final drive mechanism 16. The engine 12 is drivingly connected with the planetary transmission 914 through the input shaft 17. The planetary transmission 914 is drivingly connected with the final drive mechanism 16 through the output shaft 19. The planetary transmission 914 includes a planetary gear arrangement 918 that has a first planetary gear set 920, a second planetary gear set 930, and a third planetary gear set 940.

The planetary gear set 920 includes a sun gear member 922 and a planet carrier assembly 926. The planet carrier assembly 926 includes a plurality of pinion gears 927, 928 that are rotatably mounted on a carrier member 929. The pinion gears 927 are disposed in meshing relationship with both the sun gear member 922 and the respective pinion gear 928.

The planetary gear set 930 includes a sun gear member 932, a ring gear member 934, and a planet carrier assembly member 936. The planet carrier assembly member 936 includes a plurality of pinion gears 937 rotatably mounted on a carrier member 939 and disposed in meshing relationship with both the ring gear member 934 and the sun gear member 932. The planet carrier assembly member 936 is continuously connected with (integral with) the planet carrier assembly member 926. The pinion gears 937 are integral with pinion gears 928 (i.e., formed by long pinons).

The planetary gear set 940 includes a sun gear member 942, a ring gear member 944, and a planet carrier assembly member 946. The planet carrier assembly member 946 includes a plurality of pinion gears 947 rotatably mounted on a carrier member 949 and disposed in meshing relationship with both the sun gear member 942 and the ring gear member 944.

The planetary gear arrangement 918 also includes seven torque-transmitting mechanisms 950, 952, 954, 955, 956, 957 and 958. The torque-transmitting mechanisms 950, 952, 954, 955 and 956 are rotating-type torque-transmitting mechanisms, commonly termed clutches. The torque-transmitting mechanisms 957 and 958 are stationary-type torque-transmitting mechanisms, commonly termed brakes or reaction clutches.

The input shaft 17 is not continuously connected with any planetary gear member. The output shaft 19 is continuously connected with the ring gear member 934. The sun gear member 942 is continuously connected with the transmission housing 960 through the interconnecting member 970. The integral connection of the planet carrier assembly members 926, 936 is referred to herein as interconnecting member 972. The integral connection of the pinion gears 928, 937 is referred to herein as interconnecting member 974.

The planet carrier assembly member 926 is selectively connectable with the input shaft 17 through the clutch 950. The planet carrier assembly member 946 is selectively connectable with the input shaft 17 through the clutch 952. The ring gear member 944 is selectively connectable with the input shaft 17 through the clutch 954. The sun gear member 932 is selectively connectable with the planet carrier assembly member 946 through the clutch 955. The sun gear member 932 is selectively connectable with the ring gear member 944 through the clutch 956. The planet carrier assembly member 926 is selectively connectable with the transmission housing 960 through the brake 957. The sun gear member 922 is selectively connectable with the transmission housing 960 through the brake 958.

The truth table of FIG. 10b describes the torque-transmitting mechanism engagement sequence utilized to provide the three reverse speed ratios and eight forward speed ratios. The truth table also provides a set of examples for the ratios for each of the reverse and forward speed ratios. These numerical values have been determined utilizing the ring gear/sun gear tooth ratios given in FIG. 10b. The $N_{R1}/N_{S1}$ value is the tooth ratio of the planetary gear set 920; the $N_{R2}/N_{S2}$ value is the tooth ratio of the planetary gear set 930; and the $N_{R3}/N_{S3}$ value is the tooth ratio of the planetary gear set 940. FIG. 10b also provides a chart of the ratio steps between adjacent forward ratios and between the reverse and first forward ratio. For example, the ratio step between the first and second forward ratios is 1.46.

Figures 11A, 11B:
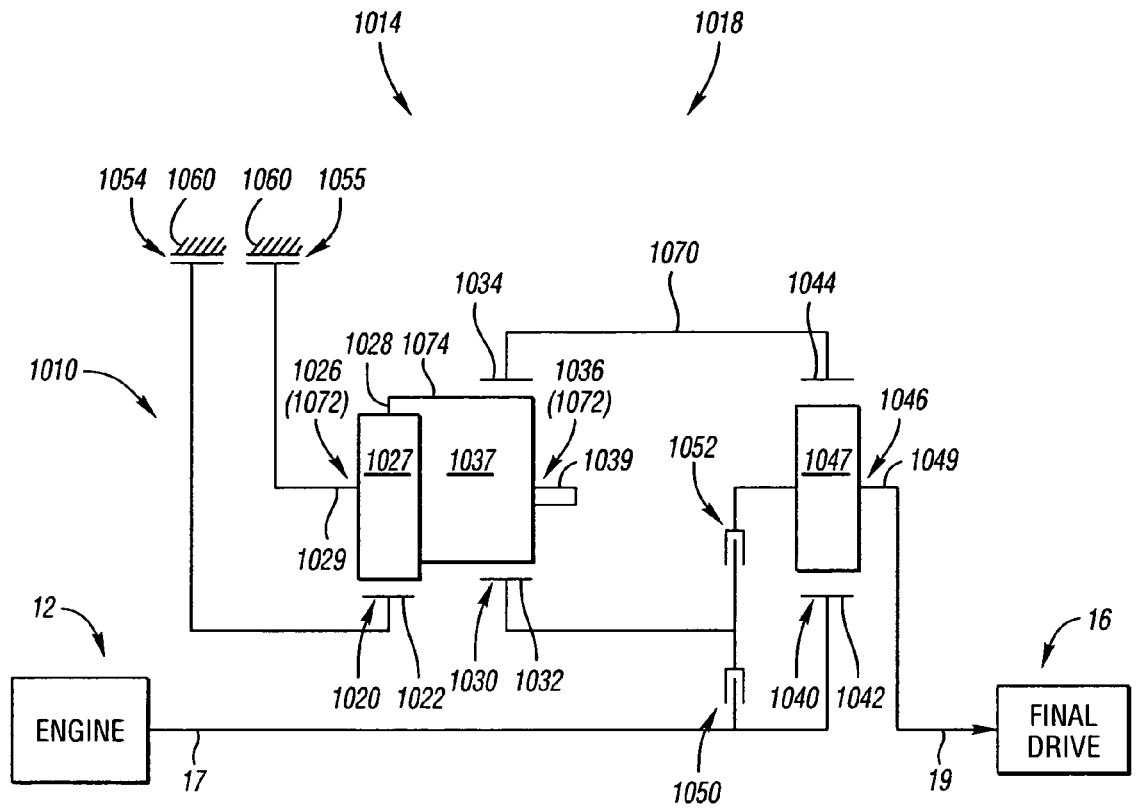

A powertrain 1010, shown in FIG. 11a, includes the conventional engine 12, a planetary transmission 1014, and the conventional final drive mechanism 16. The engine is drivingly connected with the planetary transmission 1014 through the input shaft 17. The planetary transmission 1014 is drivingly connected with the final drive mechanism 16 through the output shaft 19. The planetary transmission 1014 includes a planetary gear arrangement 1018 that has a first planetary gear set 1020, a second planetary gear set 1030, and a third planetary gear set 1040.

The planetary gear set 1020 includes a sun gear member 1022 and a planet carrier assembly 1026. The planet carrier assembly 1026 includes a plurality of pinion gears 1027, 1028 that are rotatably mounted on a carrier member 1029. The pinion gears 1027 are disposed in meshing relationship with both the sun gear member 1022 and the respective pinion gear 1028.

The planetary gear set 1030 includes a sun gear member 1032, a ring gear member 1034, and a planet carrier assembly member 1036. The planet carrier assembly member 1036 includes a plurality of pinion gears 1037 rotatably mounted on a carrier member 1039 and disposed in meshing relationship with both the ring gear member 1034 and the sun gear member 1032. The planet carrier assembly member 1036 is continuously connected with (integral with) the planet carrier assembly member 1026. The pinion gears 1037 are integral with the pinion gears 1028 (i.e., formed by long pinions).

The planetary gear set 1040 includes a sun gear member 1042, a ring gear member 1044, and a planet carrier assembly member 1046. The planet carrier assembly member 1046 includes a plurality of pinion gears 1047 rotatably mounted on a carrier member 1049 and disposed in meshing relationship with both the ring gear member 1044 and the sun gear member 1042.

The planetary gear arrangement 1018 also includes four torque-transmitting mechanisms 1050, 1052, 1054 and 1055. The torque-transmitting mechanisms 1050 and 1052 are rotating-type torque-transmitting mechanisms, commonly termed clutches. The torque-transmitting mechanisms 1054 and 1055 are stationary-type torque-transmitting mechanisms, commonly termed brakes or reaction clutches.

The input shaft 17 is continuously connected with sun gear member 1042. The output shaft 19 is continuously connected with the planet carrier assembly member 1046. The ring gear member 1034 is continuously connected with the ring gear member 1044 through the interconnecting member 1070. The integral connection of the planet carrier assembly members 1026, 1036 is referred to herein as interconnecting member 1072. The integral connection of the pinion gears 1028 and 1037 is referred to herein as interconnecting member 1074.

The sun gear member 1036 is selectively connectable with the sun gear member 1042 through the clutch 1050. The sun gear member 1032 is selectively connectable with the planet carrier assembly member 1046 through the clutch 1052. The sun gear member 1022 is selectively connectable with the transmission housing 1060 through the brake 1054. The planet carrier assembly member 1026 is selectively connectable with the transmission housing 1060 through the brake 1055.

The truth table shown in FIG. 11b describes the engagement combinations and the engagement sequence necessary to provide the reverse drive ratio and five forward speed ratios, as well as an extra second forward speed ratio. A sample of the numerical values for the ratios is also provided in the truth table of FIG. 11b. These values are determined utilizing the ring gear/sun gear tooth ratios also given in FIG. 11b. The $N_{R1}/N_{S1}$ value is the tooth ratio for the planetary gear set 1020; the $N_2/N_{S2}$ value is the tooth ratio for the planetary gear set 1030; and the $N_{R3}/N_{S3}$ value is the tooth ratio for the planetary gear set 1040. Also given in FIG. 11b is a chart describing the step ratios between the adjacent forward speed ratios and the reverse to first forward speed ratio. For example, the step ratio between the first and second forward ratios is 1.47.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
an input shaft;
an output shaft;
first, second and third planetary gear sets each having first, second and third members;
wherein one of said first and second planetary gear sets has a fourth member;
wherein only one of said first and second planetary gear sets has a ring gear member;
said output shaft being continuously interconnected with a member of said planetary gear sets;
said input shaft being continuously or selectively interconnected with a member of said planetary gear sets;
a first interconnecting member continuously interconnecting said first member of said first or second planetary gear set with said first member of said third planetary gear set or with a stationary member;
said second member of said first planetary gear set being continuously interconnected with said second member of said second planetary gear set;
said third member of said first planetary gear set being continuously interconnected with said third member of said second planetary gear set;

a first torque-transmitting mechanism selectively interconnecting a member of said first or second planetary gear set with a member of said third planetary gear set or with said input shaft;

a second torque-transmitting mechanism selectively interconnecting a member of said third planetary gear set with a member of said first or second planetary gear set, or with said input shaft;

a third torque-transmitting mechanism selectively interconnecting a member of said first or second planetary gear set with a member of said third planetary gear set or with said stationary member;

a fourth torque-transmitting mechanism selectively interconnecting a member of said first or second planetary gear set with a member of said third planetary gear set or with said stationary member;

said torque-transmitting mechanisms being engaged in combinations to establish at least five forward speed ratios and at least one reverse speed ratio between said input shaft and said output shaft;

wherein the first, second and third members of the respective first and second planetary gear sets and the fourth member of said one of said first and second planetary gear sets include a respective sun gear member;

wherein the sun gear member of said first planetary gear set is not continuously connected to any of said members of said third planetary gear set;

wherein the sun gear member of said second planetary gear set is not continuously connected to any of said members of said third planetary gear set; and wherein one of said first, second, third and fourth torque transmitting mechanisms selectively interconnects one of said members of said third planetary gear set with one of said members of said first or second planetary gear set.

2. The transmission defined in claim 1, wherein at least one planet carrier assembly member of said planetary gear sets is a double-pinion carrier.

3. The transmission defined in claim 1, wherein said first, second and third members of the respective first and second planetary gear sets and the fourth member of said one of said first and second planetary gear sets are selected from a ring gear member, said sun gear member, a planet carrier assembly member, and a pinion gear, in any order; and wherein the first, second and third members of the third planetary gear set are selected from a ring gear member, a sun gear member and a planet carrier assembly member.

4. The transmission defined in claim 1, further comprising:
a fifth torque-transmitting mechanism selectively interconnecting a member of said third planetary gear set with a member of said first or second planetary gear set, or with said stationary member.

5. The transmission defined in claim 4, further comprising:
a sixth torque-transmitting mechanism selectively interconnecting a member of said first, second or third planetary gear set with another member of said first or second planetary gear set, or with said stationary member.

6. A multi-speed transmission comprising:
an input shaft;
an output shaft;
a planetary gear arrangement having first, second and third planetary gear sets, each planetary gear set having first, second and third members;
wherein one of said first and second planetary gear sets has a fourth member;

wherein only one of said first and second planetary gear sets has a ring gear member;

said output shaft being continuously interconnected with a member of said planetary gear sets;

said input shaft being continuously or selectively interconnected with a member of said planetary gear sets;

wherein the first, second and third members of the third planetary gear set include a ring gear member and a sun gear member;

a first interconnecting member continuously interconnecting said first member of said first or second planetary gear set with the ring gear member of said third planetary gear set or with the sun gear member of said third planetary gear set or with a stationary member;

said second member of said first planetary gear set being continuously interconnected with said second member of said second planetary gear set;

said third member of said first planetary gear set being continuously interconnected with said third member of said second planetary gear set;

wherein the members of the first planetary gear set include a sun gear member;

wherein the sun gear member of the first planetary gear set is not continuously connected to any of said members of said third planetary gear set;

wherein the members of the second planetary gear set include a sun gear member;

wherein the sun gear member of the second planetary gear set is not continuously connected to any of said members of said third planetary gear set;

four torque-transmitting mechanisms for selectively interconnecting said members of said planetary gear sets with said input shaft, with said stationary member or with other members of said planetary gear sets, said four torque-transmitting mechanisms being engaged in combinations to establish at least five forward speed ratios and at least one reverse speed ratio between said input shaft and said output shaft; and wherein one of said four torque transmitting mechanisms selectively interconnects one of said members of said third planetary gear set with one of said members of said first or second planetary gear set.

7. The transmission defined in claim 6, wherein a first of said four torque-transmitting mechanisms is operable for selectively interconnecting a member of said first or second planetary gear set with a member of said third planetary gear set, or with said input shaft.

8. The transmission defined in claim 7, wherein a second of said four torque-transmitting mechanisms is operable for selectively interconnecting a member of said third planetary gear set with a member of said first or second planetary gear set, or with said input shaft.

9. The transmission defined in claim 8, wherein a third of said four torque-transmitting mechanisms is selectively operable for interconnecting a member of said first or second planetary gear set with a said third planetary gear set, or with said stationary member.

10. The transmission defined in claim 9, wherein a fourth of said four torque-transmitting mechanisms is selectively operable for interconnecting a member of said first or second planetary gear set with a member of said third planetary gear set, or with said stationary member.

11. The transmission defined in claim 10, further comprising:

a fifth torque-transmitting mechanism selectively interconnecting a member of said third planetary gear set with a member of said first or second planetary gear set, or with said stationary member.

12. The transmission defined in claim 11, further comprising:
a sixth torque-transmitting mechanism selectively interconnecting a member of said first, second or third planetary gear set with a member of said first or second planetary gear set, or with said stationary member.

13. The transmission defined in claim 6, wherein at least one planet carrier assembly member of said planetary gear sets is a double-pinion carrier.

14. The transmission defined in claim 6, wherein said first, second and third members of the respective first and second planetary gear sets and the fourth member of said one of said first and second planetary gear sets are selected from a ring gear member, a sun gear member, a planet carrier assembly member, and a pinion gear, in any order; and
wherein the first, second and third members of the third planetary gear set include a planet carrier assembly member.

15. A multi-speed transmission comprising:
an input shaft;
an output shaft;
first, second and third planetary gear sets each having first, second and third members;
wherein one of said first and second planetary gear sets has a fourth member;
wherein only one of said first and second planetary gear sets has a ring gear member;
wherein the first, second and third members of the third planetary gear set include a planet carrier assembly member and a ring gear member;
said output shaft being continuously interconnected with a member of said planetary gear sets;
said input shaft being continuously or selectively interconnected with a member of said planetary gear sets;
wherein the input shaft is not directly connected to the ring gear member of the third planetary gear set;
a first interconnecting member continuously interconnecting said first member of said first or second planetary gear set with said first member of said third planetary gear set or with a stationary member or a first interconnecting member continuously interconnecting one of said members of said third planetary gear set with a stationary member;
said second member of said first planetary gear set being continuously interconnected with said second member of said second planetary gear set;
said third member of said first planetary gear set being continuously interconnected with said third member of said second planetary gear set;
a first torque-transmitting mechanism selectively interconnecting a member of said first or second planetary gear set with a member of said third planetary gear set or with said input shaft;
a second torque-transmitting mechanism selectively interconnecting a member of said third planetary gear set with a member of said first or second planetary gear set, or with said input shaft;
a third torque-transmitting mechanism selectively interconnecting a member of said first or second planetary gear set with a member of said third planetary gear set or with said stationary member;
a fourth torque-transmitting mechanism selectively interconnecting a member of said first or second planetary gear set with a member of said third planetary gear set or with said stationary member;
said torque-transmitting mechanisms being engaged in combinations to establish at least five forward speed ratios and at least one reverse speed ratio between said input shaft and said output shaft;
wherein the members of the first planetary gear set include a sun gear member;
wherein the sun gear member of the first planetary gear set is not continuously connected to any of said members of said third planetary gear set;
wherein the members of the second planetary gear set include a sun gear member;
wherein the sun gear member of the second planetary gear set is not continuously connected to any of said members of said third planetary gear set;
wherein the transmission is configured such that it is never the case that the planet carrier assembly member of the third planetary gear set is selectively interconnected with both the sun gear member of the first planetary gear set and the sun gear member of the second planetary gear set;
wherein the transmission is configured such that it is never the case that the ring gear member of the third planetary gear set is selectively interconnected with both the sun gear member of the first planetary gear set and the sun gear member of the second planetary gear set; and
wherein one of said first, second, third and fourth torque transmitting mechanisms selectively interconnects one of said members of said third planetary gear set with one of said members of said first or second planetary gear set.

* * * * *